US006966934B1

(12) United States Patent
Sato et al.

(10) Patent No.: US 6,966,934 B1
(45) Date of Patent: Nov. 22, 2005

(54) GAS RECLAIMING EQUIPMENT (75) Inventors: Toshikazu Sato, Tokyo (JP); Toshiaki Inohara, Kanagawa-ken (JP); Hiroshi Murase, Kanagawa-ken (JP); Hiromi Naotsuka, Kanagawa-ken (JP); Takahiro Imai, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 946 days.

(21) Appl. No.: 09/672,775

(22) Filed: Sep. 29, 2000

(30) Foreign Application Priority Data

Oct. 1, 1999 (JP) ................................ 11-282045

(51) Int. Cl.$^7$ ........................... B01D 39/00; A62B 7/08
(52) U.S. Cl. ........................ 55/338; 55/385.2; 55/410; 55/467; 55/469; 95/273; 210/640; 422/120; 422/122
(58) Field of Search ............................. 55/338, 385.2, 55/410, 467, 469; 95/273; 210/640; 422/120, 422/122

(56) References Cited

U.S. PATENT DOCUMENTS

| | | | | |
|---|---|---|---|---|
| 3,210,952 A | * | 10/1965 | Strom ......................... 62/606 |
| 3,361,532 A | * | 1/1968 | Massonne .................... 423/469 |
| 3,675,392 A | * | 7/1972 | Reighter ......................... 95/96 |
| 3,992,159 A | * | 11/1976 | Mitchell ..................... 23/294 R |
| 4,274,851 A | * | 6/1981 | Stokes ......................... 62/601 |
| 4,283,212 A | * | 8/1981 | Graham et al. ............... 62/636 |
| 4,975,259 A | * | 12/1990 | Hyakutake et al. .......... 423/406 |
| 5,051,114 A | * | 9/1991 | Nemser et al. ................. 95/47 |
| 5,240,471 A | * | 8/1993 | Barbe et al. .................... 95/54 |
| 5,252,219 A | * | 10/1993 | Xu ............................. 210/640 |
| 5,378,263 A | * | 1/1995 | Prasad ........................... 95/54 |
| 5,417,742 A | * | 5/1995 | Tamhankar et al. ............. 95/96 |
| 5,455,016 A | * | 10/1995 | Choe et al. .................. 423/359 |
| 5,482,539 A | * | 1/1996 | Callahan ......................... 95/51 |
| 5,502,969 A | * | 4/1996 | Jin et al. ....................... 62/617 |
| 5,720,797 A | * | 2/1998 | Yates et al. ..................... 95/96 |
| 5,730,779 A | * | 3/1998 | Chernyakov et al. .......... 95/45 |
| 6,164,088 A | * | 12/2000 | Moriguchi et al. ........... 62/636 |

* cited by examiner

FOREIGN PATENT DOCUMENTS

JP           9-285719           11/1997

OTHER PUBLICATIONS

M. Toyda et al., Application of Pressure Swing Adsorption to SF6 Separation and Liquefaction from SF$_6$/N$_2$ Mixtures, IEEE Pwer Engineering Society 2000 Winter Meeting, Jan. 23-27, 2000, Singapore.

Primary Examiner—Glenn Caldarola
Assistant Examiner—Alexis Wachtel
(74) Attorney, Agent, or Firm—Foley & Lardner LLP (57) ABSTRACT A gas reclaiming equipment capable of separating SF$_6$ gas from a mixed gas efficiently and shortening reclaiming work under reduced pressure. A gas separation equipment is provided between a gas insulated equipment and a gas liquefaction system. The gas separation equipment separates nitrogen gas from the mixed gas, and concentrates SF6 gas. Only SF$_6$ gas is sent into the gas liquefaction system. The gas separation equipment uses pressure swing adsorption using an adsorbent with selective adsorption. Moreover, a buffer tank for storing mixed gas is provided between the gas separation equipment and the gas insulated equipment. The buffer tank and the gas liquefaction system are connected by a reflux-line. The reflux-line refluxes the gas in a gas phase in the gas liquefaction system to the buffer tank. Furthermore, the gas separation equipment is connected to a storage tank. The storage tank accumulates the nitrogen gas separated with the gas separation equipment. The adsorbent to adsorb SF$_6$ gas is enclosed in the storage tank for exhaust gas. To absorb decomposed gas, the filter has an adsorbent of the chemisorption type. The adsorbent has of a metal hydrate.

23 Claims, 8 Drawing Sheets

ADSORPTION CHARACTERISTIC OF 10 Å ZEOLITES

GAS RECLAIMING EQUIPMENT

BACKGROUND

1. Field of the Invention

The present invention relates to gas reclaiming equipment used for gas insulated equipment filled with an insulating gas, and more particularly to gas reclaiming equipment adapted for gas-insulated equipment filled with environmentally problematic gasses such as $SF_6$/nitrogen insulating gas mixtures.

2. Description of the Related Art

Generally, a substation has a circuit breaker and a disconnector to perform a system change and a maintenance check. In particular, large-sized equipment from among the above mentioned equipment use gas insulated equipment filled with $SF_6$ gas is especially adopted.

Generally, $SF_6$ gas is highly desirable because of its insulation performance and arc interruption performance. Moreover, since $SF_6$ gas is a chemically stable and harmless gas, it has been widely adopted as an insulation medium in the above-mentioned equipment. However, $SF_6$ gas contributes to the greenhouse effect and has a long decomposition life.

Because of environmental protection concerns over a long period of time, the exhaust of $SF_6$ gas is regulated. Therefore, when performing periodic inspection and parts exchange, the $SF_6$ gas should be reclaimed so that it does not leak to the outside from the gas insulated equipment.

When reclaiming and storing the $SF_6$ gas, a large-size tank for storing the $SF_6$ gas is necessary as the volume of the $SF_6$ gas gets large. However, it is advantageous to change the gas into a high-pressure state and to reduce the volume of the $SF_6$ gas. This, however, may generate safety problems.

Accordingly, it has been proposed to use gas reclaiming equipment that converts the $SF_6$ gas to $SF_6$ liquid by pressurization and liquefaction of $SF_6$. By using such equipment, the tank for reclaiming can be greatly reduced. Furthermore, the safety can be improved.

Figure 1:
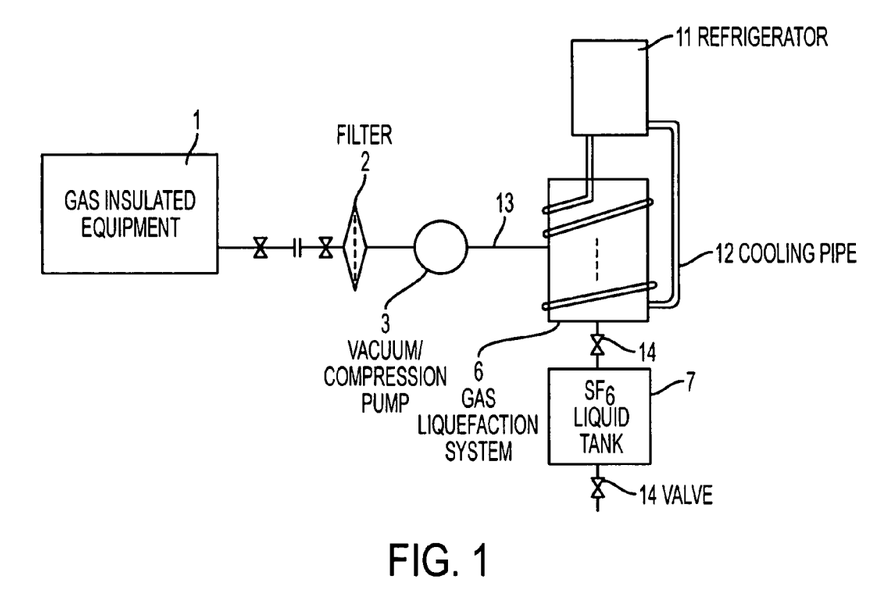
FIG. 1 is a diagram showing a basic structure of conventional gas reclaiming equipment.

FIG. 1 shows a basic structure of the gas reclaiming equipment. The gas reclaiming equipment is used for reclaiming the gas from gas insulated equipment 1. The gas reclaiming equipment consists of a filter 2, a vacuum/compression pump 3, a gas liquefaction system 6, an $SF_6$ liquid tank 7, a refrigerator 11, and a cooling pipe 12.

The gas-insulated equipment 1, the filter 2, the vacuum/compression pump 3, the gas liquefaction system 6, and the $SF_6$ liquid tank 7 are connected to each other through a pipe 13. A valve 14 for controlling the flow rate from the gas liquefaction system 6 or the $SF_6$ liquid tank 7 is provided. In addition, the filter 2 adsorbs decomposed gas of $SF_6$, which occurs due to an arc. The filter also absorbs particulate foreign substances.

$SF_6$ gas with high-purity and high-dryness is required for the gas insulated equipment 1. Therefore, an adsorbent is used for the purpose of removing moisture or decomposed gas. As the adsorbent, Zeolites with a pore size of approximately 5 Å or 10 Å are commonly used, since the decomposed gas molecules are larger than a molecule of $H_2O$. Even, Zeolites with pore size of 9 Å can be used. That is, the size depends on what kind of gas is being reclaimed.

In a conventional gas reclaiming equipment, the $SF_6$ gas is sent into the gas liquefaction system 6 from the gas insulated equipment 1 through the vacuum/compression pump 3. Additionally, a refrigerant, like chlorofluorocarbon, is sent through the cooling pipe 12 from the refrigerator 11. The $SF_6$ gas is liquefied in the gas liquefaction system 6 and then the reclaimed $SF_6$ liquid is stored in liquid tank 7.

If moisture, and various decomposition gases (HF, $H_2O$, $SO_2$ and $SOF_2$, $SO_2F_2$), and a related gas molecule ($CF_4$), are put in order in terms of the largest to smallest adsorption power, the order could be shown below:

HF, $H_2O$, $SO_2$ and $SOF_2$, $SO_2F_2$, $CO_2$, $SF_6$, $CF_4$, $N_2$, $O_2$

In the above-mentioned list, the reactivity of HF is the highest and HF is chemisorbed. Its adsorption energy is about 100 kcal/mol. It is believed that the rest of the gasses are absorbed by physisorption. The adsorption energy in physisorption is approximately 1–4 kcal/about mol.

Compared with chemisorption, physisorption is weaker in terms of adsorption. So, it is believed that gas molecules de-sorb from the adsorbent under the influence of molecular movement in a reduced pressure state. In addition, even if the molecule with weak adsorption is adsorbed by physisorption, when a molecule with strong adsorption arrives, the molecular with strong adsorption adsorbs such that the molecule with the strong adsorption replaces the molecule with weak adsorption.

Among these gases, it is hard to de-sorb moisture under reduced pressure. However, under a reduced pressure state for reclaiming $SF_6$ gas, gases such as $SOF_2$, $SO_2F_2$, $CO_2$, $SF_6$, $CF_4$, $N_2$, and $O_2$ de-sorb from the adsorbent. Therefore, gases such as $SOF_2$, $SO_2F_2$, $CO_2$, $SF_6$, $CF_4$, $N_2$, and $O_2$ may discharge from the gas insulated equipment 1, and may go into the reclaiming equipment. If so, the filter 2 catches the decomposed gas and any foreign substances, and prevents invasion of the decomposed gas and foreign substances into the gas liquefaction system 6.

For when the earth's environment, the quantity of discharged $SF_6$ gas needs to be reduced further. For that purpose, it is desirable to reduce the quantity of $SF_6$ gas used.

The use of mixed gas, having nitrogen gas as a main component and a little $SF_6$ gas, is considered to be effective in the curtailment of $SF_6$ gas. However, the properties of $SF_6$ gas and nitrogen gas differ remarkably. That is, under the conditions in which $SF_6$ gas liquefies, nitrogen gas does not liquefy simultaneously. Nitrogen still exists as a gas. Therefore, it is possible to liquefy only $SF_6$ gas in a mixed gas and to separate $SF_6$ gas from nitrogen gas.

The characteristic values of mixture ratio and liquefaction pressure are shown in Table 1.

TABLE 1

| Mixture ratio | Liquefaction pressure |
| --- | --- |
| 100 vol % $SF_6$ gas | 2 Mpa |
| 50 vol % $SF_6$ gas | 4 Mpa |
| 10 vol % $SF_6$ gas | More than 20 Mpa |

If the purity of $SF_6$ gas is high, the pressurization liquefaction of $SF_6$ gas is easy at room temperature, such as 20 degrees C. However, in order to liquefy $SF_6$ gas in a mixed gas, high pressure is needed.

As shown in Table 1, since a pressure of 20 Mpa or more is needed at room temperature, the liquefaction of $SF_6$ is very difficult in the case of 10 vol % $SF_6$ gas. Moreover, large-sized refrigeration equipment needs to be used and the liquefaction pressure needs to be lowered. Consequently, the enlargement of equipment has become a problem in reclaiming and recycling mixed gas.

Gas reclaiming equipment is disclosed in Japanese Patent Disclosure (Kokai) No. 2000-135412. However, there are the following problems with the conventional technology of reclaiming mixed gases containing $SF_6$ gas. That is, when a mixed gas is incorporated into the gas liquefaction system 6 and the gas liquefaction system 6 liquefies $SF_6$ gas continuously, the following problem occurs.

The concentrated $SF_6$ gas is liquefied in the gas liquefaction system 6, but the main composition gas, such as nitrogen gas, of the mixed gas continues to accumulate in the gas liquefaction system 6. Therefore, before exceeding the design pressure of the gas liquefaction system 6, this main composition gas needs to be extracted from the gas liquefaction system 6.

However, the main composition gas may contain some $SF_6$ gas, and thus the main composition gas cannot be emitted into the atmosphere. Therefore, in order to prevent the $SF_6$ gas from remaining in the main composition gas, the reclaiming ratio of $SF_6$ gas is preferably improved. Moreover, in considering reclaiming the mixed gas, the gas pressure in the gas-insulated equipment is high early in the reclaiming stage. Therefore, the gas automatically flows into the reclaiming equipment side by only opening a valve. As a result, adjusting the flow rate is easier.

However, in the case when the reclaiming work has been performed, the reclaiming work under reduced pressure becomes necessary. The reclaiming work depends on the capability of the vacuum/pressurization pump. The processing quantity per unit time is reduced under reduced pressure. Therefore, it becomes difficult to secure a sufficient flow rate and the reclaiming efficiency is lowered.

Furthermore, when gas is forcibly extracted with the vacuum/pressurization pump, decomposed gas de-sorbs from the adsorbent in the gas insulated equipment beforehand. Therefore, the decomposed gas will be discharged into the reclaiming equipment side.

If the decomposed gas enters the reclaiming equipment, the life of the reclaiming equipment is adversely affected. Decomposed gas causes, for example, chemical degradation of the pipes in the reclaiming equipment and degradation of the material of the adsorbent.

Therefore, it is desirable that the decomposed gas discharged from the gas insulated equipment be captured with certainty. Moreover, as mentioned above, in the gas insulated equipment, an adsorbent having various Zeolites, for example Zeolites with 5 Å or 10 Å pores, is usually enclosed.

At this time, the adsorbent includes Zeolites with approximately 10 Å pores which adsorbs $SF_6$ gas for reclaiming. Therefore, if there is a high quantity of the adsorbent, when reclaiming in a reduced pressure condition, the $SF_6$ gas will de-sorb from the gas insulated equipment side gradually for a long period of time. Therefore, there is a problem in that the reclaiming of $SF_6$ gas takes a long time. On the other hand, if the adsorbent material has Zeolites with a size if 5 Å, it is difficult to adsorb a decomposed gas larger than 5 Å in size, and the rate of absorption may decrease.

Therefore, optimization of the combination of Zeolites in the adsorbent in the gas-insulated equipment is desired.

SUMMARY OF THE INVENTION

The present invention has been made in view of the above-mentioned circumstances and is intended to solve the above-mentioned problems. In particular, the object of the present invention is to provide a gas reclaiming equipment having a simple and inexpensive structure, and capable of reclaiming $SF_6$ gas with high efficiency.

The present invention provides a gas reclaiming equipment including: a filter for removing a decomposed gas and particulate foreign substances from a mixed gas which is sent from the gas insulated equipment; a pump for sending the mixed gas from the gas insulated equipment to the gas liquefaction system; a gas liquefaction system for reclaiming the mixed gas, wherein the gas liquefaction system liquefies the $SF_6$ gas of the mixed gas by pressurizing the mixed gas; a storage tank for accumulating a $SF_6$ liquid obtained by the gas liquefaction system; and a line for returning a gas phase in the gas liquefaction system to a upstream side of the gas liquefaction system.

BRIEF DESCRIPTION OF DRAWINGS

The accompanying drawings, which are incorporated in and constitute a part of this specification, illustrate several preferred embodiments of the present invention and, together with the description, serve to explain the principles of the present invention.

DESCRIPTION OF PREFERRED EMBODIMENTS

Preferred embodiments of gas reclaiming equipment of the present invention are now specifically described in more detail with reference to the accompanying drawings. Wherever possible, the same reference numbers are used throughout the drawings to refer to the same or like parts.

Figure 2:
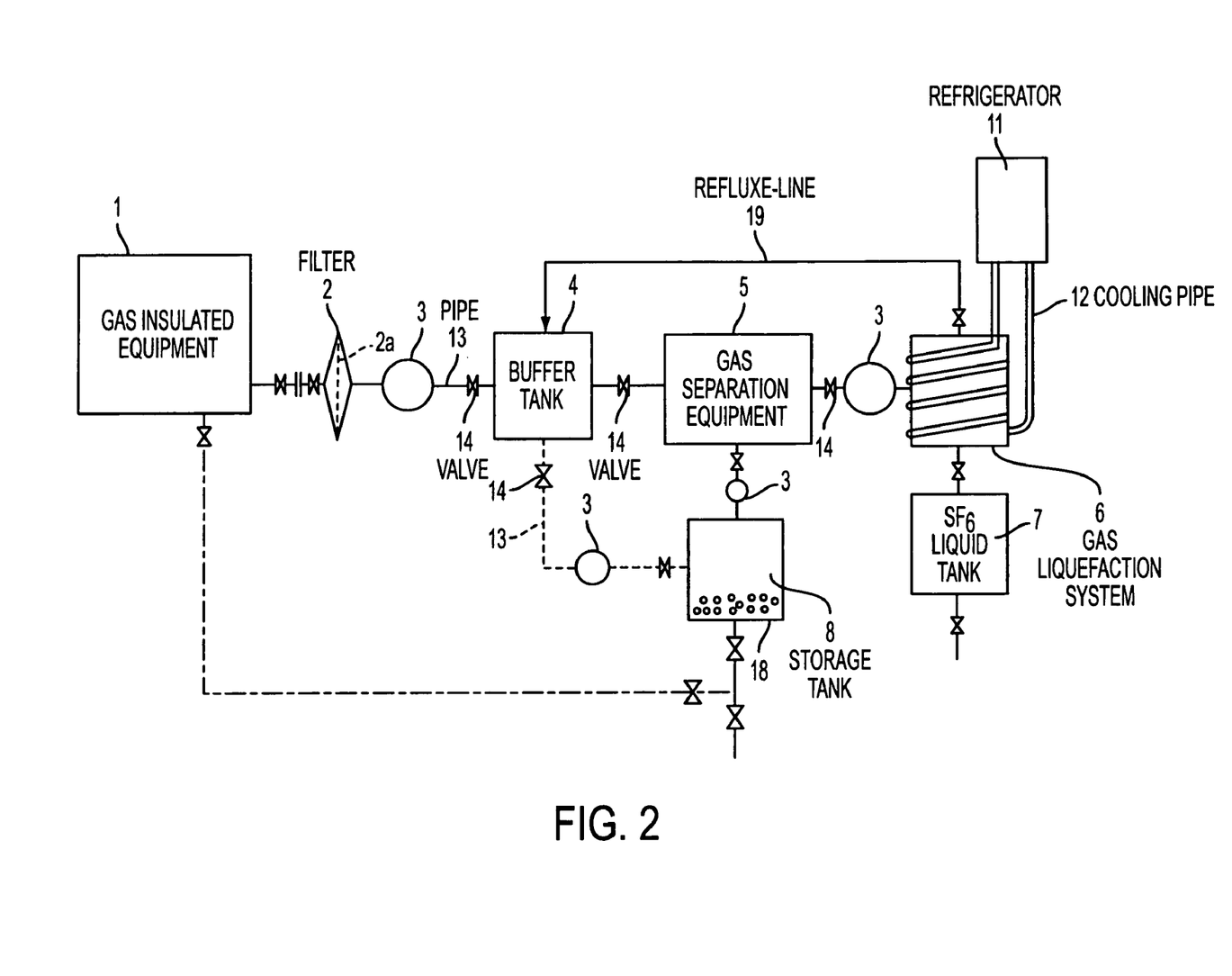
FIG. 2 is a diagram showing gas reclaiming equipment according to a first embodiment of the present invention.

FIG. 2 is a diagram showing gas reclaiming equipment according to a first embodiment of the present invention. Gas separation equipment 5 is provided between gas insulated equipment 1 and a gas liquefaction system 6. The gas separation equipment 5 separates nitrogen gas from mixed gas, and concentrates the $SF_6$ gas. Thereafter, only $SF_6$ gas is sent into the gas liquefaction system 6.

The gas separation equipment 5 includes pressure swing adsorption using an adsorbent with selective adsorption. Moreover, a buffer tank 4, which stores the mixed gas temporarily, is provided between the gas separation equipment 5 and the gas insulated equipment 1. The buffer tank 4 is operated on the condition that the inside of the buffer tank is pressurized at all times.

The buffer tank 4 and the gas liquefaction system 6 are connected by a reflux-line 19. The reflux-line 19 refluxes the gas in a gas-phase from the gas liquefaction system 6 to the buffer tank 4. The gas-phase contains a very small quantity of $SF_6$ gas which is equivalent to the vapor pressure of $SF_6$. Furthermore, the gas separation equipment 5 is connected to a storage tank 8 for exhaust gas. The storage tank 8 accumulates the nitrogen gas separated through the gas separation equipment 5.

The adsorbent 18 having approximately 10 Å Zeolites for adsorbing $SF_6$ gas is enclosed in the storage tank 8 for the exhaust gas. A filter 2 having an adsorbent 2a of the chemisorption type to absorb decomposed gas is interposed between the gas insulated equipment and a pump 3. The adsorbent 2a has a metal hydrate, such as $Ca(OH)_2$. The above components are connected with the pipe 13. A valve 14 controls the flow.

Operation of the first embodiment will now be described. First, the separation principle of gas in the gas separation equipment 5 is explained by reference to FIG. 2, FIG. 3, and FIG. 4 and FIG. 10.

Figure 3:
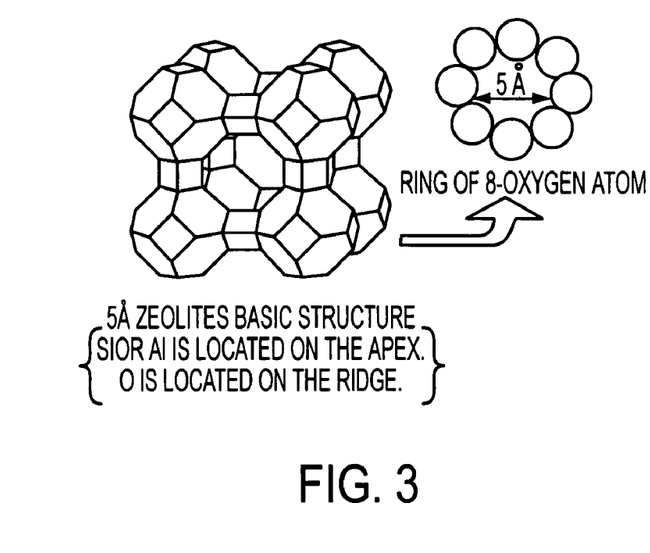
FIG. 3 is a diagram showing the gas separation principle according to the first embodiment of the present invention.

The Zeolites shown in FIG. 3, used as the adsorbent, are enclosed in the gas separation equipment 5. Zeolites are a generic name for crystalline aluminosilicates of alkali. The general formula of Zeolites is shown by $MeO.Al_2O_3.mSiO_2.nH_2O$. Moreover, Zeolites have uniform pores on their surface.

Figure 10:
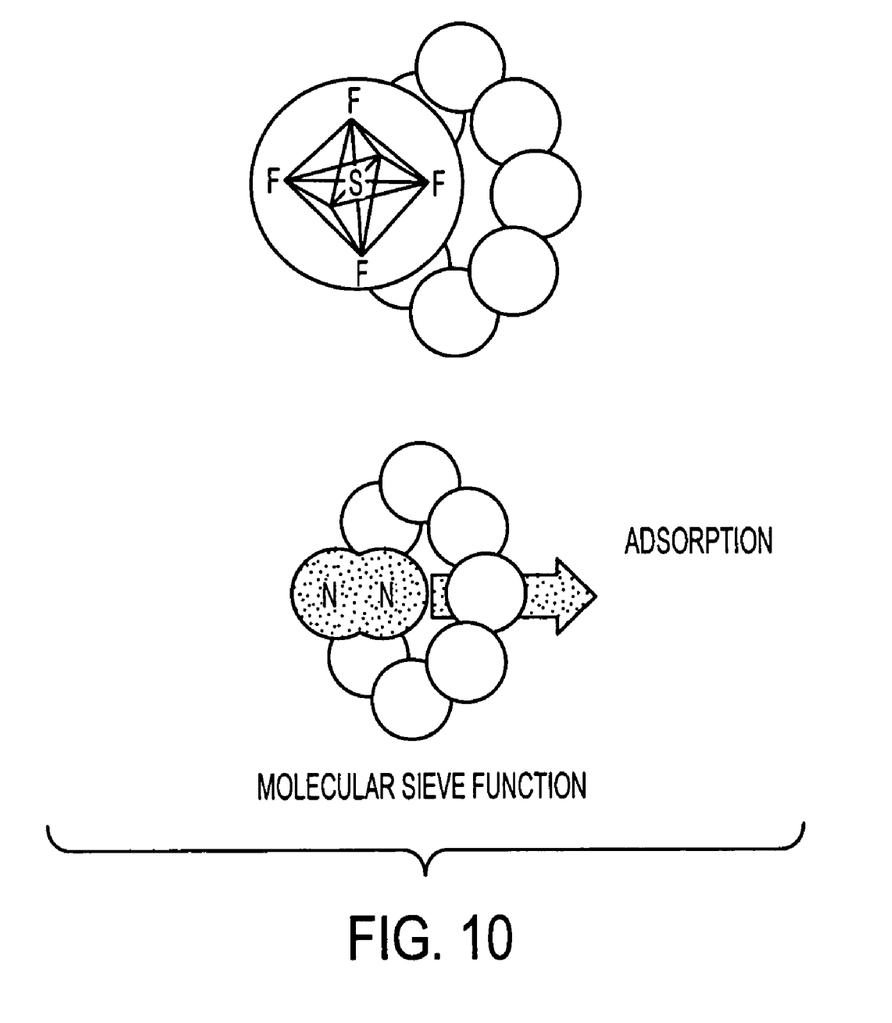
FIG. 10 is a diagram further explaining the gas separation principle.

Since only a molecule smaller than the pore can pass along a narrow pipe of Zeolites, the molecule can be adsorbed inside, as illustrated in FIG. 10. The pores in the Zeolite act like small holes while the molecules of $SF_6$ and nitrogen gas act like small balls. The "balls" of the same size as the pores get stuck in the pores. This illustrates the outstanding selective adsorption, or molecular sieve effect.

On the one hand, $SF_6$ gas and nitrogen gas differ from each other in molecular size. The size of the $SF_6$ molecule varies from DS5.49–DL6.06, and the size of the nitrogen molecule varies from DS3.1–DL4.2. The unit of size is A. DS shows the shorter parameter of the molecule. DL shows the longer parameter of the molecule. Molecular size is described with DS and DL because of its non-spherical shape.

When using Zeolite with a pore-diameter of 5 Å, $SF_6$ gas is not adsorbed. This is because $SF_6$ gas is larger than the pore in the Zeolite surface. Nitrogen gas is adsorbed alternatively, and separation of $SF_6$ gas is provided.

Zeolites have a metal cation in the crystal structure. The metal cation attracts a polar group by static electricity, or a neutral molecule electrically by polarization. Thus, it is believed that the metal cation is widely applicable based on the above mentioned reason.

Figure 4:
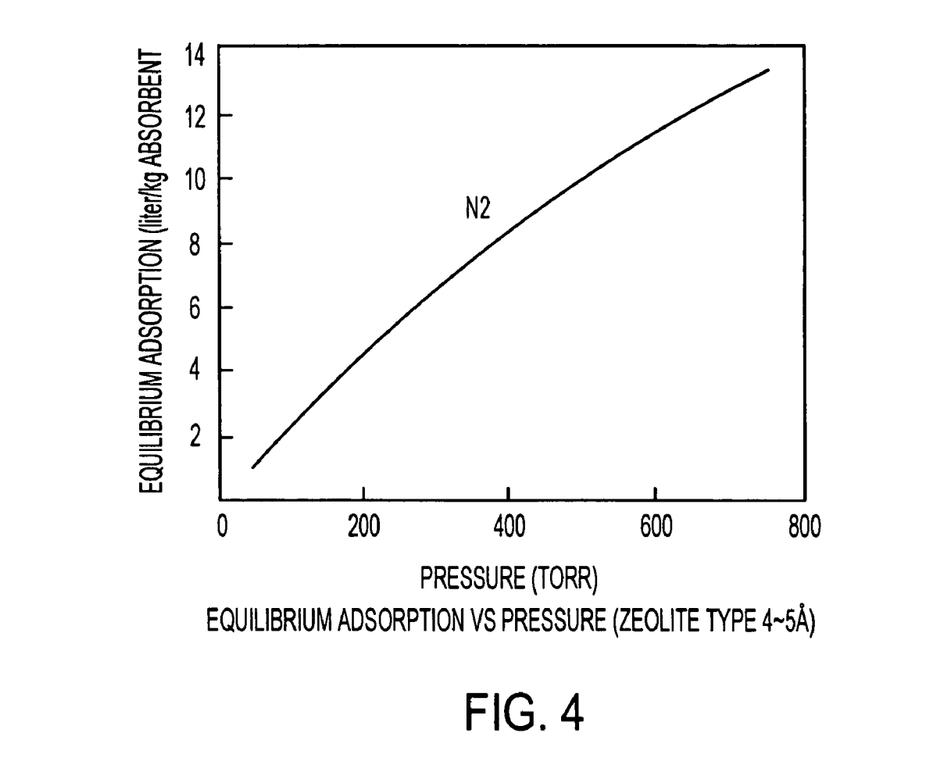
FIG. 4 is a graph showing the relationship between the equilibrium adsorption and the pressure for a zeolite.

The gas separation equipment 5 separates the mixed gas with Zeolites by the selective adsorption mentioned above using the pressure swing adsorption method. The basic principle of the pressure swing adsorption method is that the adsorption quantity of the adsorbent is proportional to the gas pressure. FIG. 4 is a graph showing the relationship between the adsorption quantity and pressure.

Figure 5:
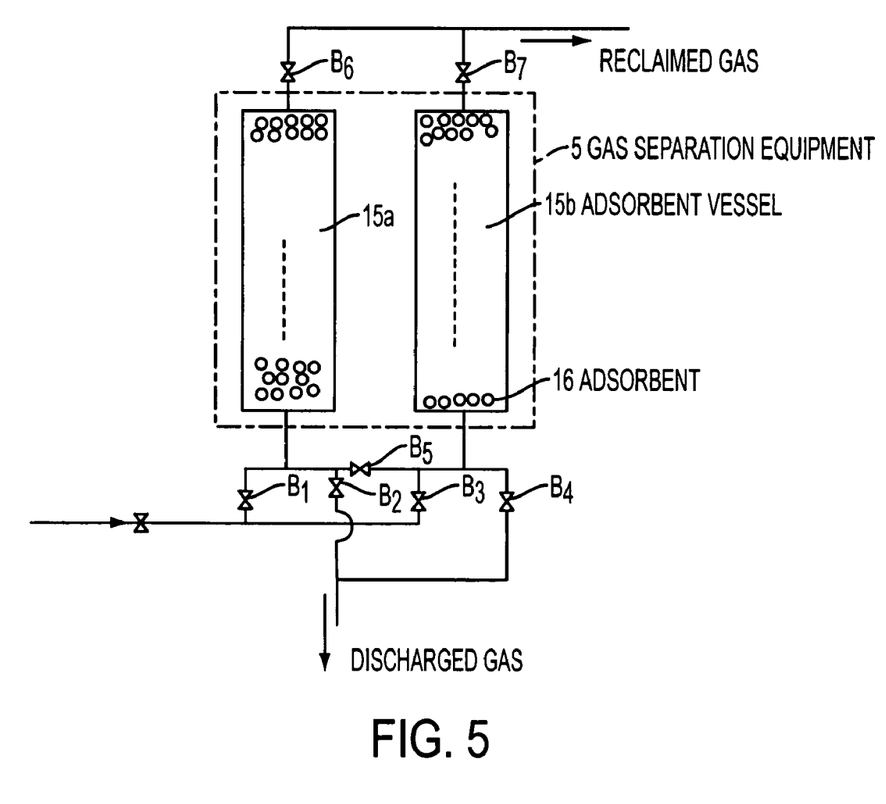
FIG. 5 is a detailed diagram showing the gas reclaiming equipment according to the first embodiment of the present invention.

FIG. 5 is a detailed diagram showing a main part of the gas separation equipment 5. That is, the gas separation equipment 5 has two adsorbent vessels 15a and 15b. An adsorbent 16 with 5 Å Zeolites is contained in the two adsorbent vessels 15a and 15b.

The fundamental run pattern of valves B1, B2, B3, B4, B5, B6 and B7 will now be explained. Valves B1 and B4 are open, and the other valves are closed. Moreover, valve B4 is combined with the vacuum/compression pump 3 on the condition that valve B4 is open, and reduced pressure processing is carried out.

First, separation of $SF_6$ gas will be explained. The mixed gas in the gas insulated equipment flows to a down-stream side with the vacuum/compression pump 3, through the buffer tank 4. The mixed gas flows into the adsorbent vessel 15a in the gas separation equipment 5.

At this time, the adsorbent vessel 15b is controlled by the vacuum/compression pump 3 under reduced pressure. It is in the early regeneration state and emits the adsorbed nitrogen gas. In the adsorbent vessel 15a, the adsorbent adsorbs only nitrogen gas by the molecular sieve effect. On the one hand, $SF_6$ gas flows along the upper part, along the flow route, raising its concentration. Finally, gas with high $SF_6$ gas concentration accumulates on the upper part of the adsorbent vessel 15a.

When the pressure in the adsorbent vessel 15a gets to a predetermined pressure, inflow of mixed gas is stopped, by closing the valve B1, and $SF_6$ gas concentrated by opening valve B6 is reclaimed. In addition, for better efficiency and stability, values within the limits at 0.2–0.5 MPa are usually used.

Subsequently, while valve B6 is closed, the flow route of mixed gas is changed into the adsorbent vessel 15b side by opening valve B3. Thus, $SF_6$ gas will be separated and concentrated in the adsorbent vessel 15b. First, reduced pressure processing in the adsorbent vessel 15a side is carried out, and the nitrogen gas de-sorbs. While the nitrogen gas is discharged by opening valve B2, the adsorbent 16 will be in the initial state before the adsorbent starts adsorbing.

By repeating the above-mentioned operation, mixed gas is separated into $SF_6$ gas and nitrogen gas. $SF_6$ concentrated gas is then sent into the gas liquefaction system 6.

As mentioned above, only nitrogen gas smaller than the pore diameter of the adsorbent 16 can be adsorbed during the adsorption process using high pressure. If the pressure is reduced in the adsorption process, the nitrogen gas currently adsorbed to the adsorbent 16 will de-sorb, and, finally nitrogen gas will be discharged. Furthermore, the adsorbent 16 will be in the initial state simultaneously through this operation. Then, again, when the gas pressure increases, the same quantity of nitrogen gas discharged can be absorbed. Thus, a repeating operation of absorption and regeneration makes semi-permanent separation of the mixed gas possible.

However, as mentioned above, the initial performance deteriorates gradually due to the strong bonding of moisture and decomposed gas with the adsorbent 16. In such a situation, in order to prevent mixing of the decomposed gas, a designated purity control needs to be carried out. The gas flowed into the reclaiming equipment should be controlled.

As mentioned above, if the initial $SF_6$ gas concentration is 10 vol %–50 vol % of the mixed gas, the liquefaction pressure will be set to about 4 MPa at room temperature. Therefore, the existing liquefaction equipment can be used and the risk of liquefaction under high-pressure is also decreased remarkably. Moreover, even though the liquefaction may be performed by using cooling, the increase in size of the equipment is avoidable.

For example, at 20 degrees C., the liquefaction pressure can be reduced up to about 1.3 MPa. Moreover, even if pressure of the gas insulated equipment 1 is reduced in the reclaiming process and the flow rate of mixed gas decreases, mixed gas can be accumulated in the buffer tank 4 temporarily. Therefore, the operation after the gas separation equipment 5 can be stopped, and sufficient flow rate and amount of mixed gas put into the gas separation equipment 5 can be secured by gas accumulation into the buffer tank 4.

That is, the appropriate gas flow rate under the reduced pressure condition can be realized, and high reclaiming efficiency can be maintained.

In addition, when the quantity of gas runs short in the buffer tank 4, the reclaiming operation can be stopped and the valves closed. The remaining reclaiming process can then be carried out at the following gas reclaiming operation for another gas insulated equipment. Reduced pressure processing is unnecessary in the buffer tank 4 for the above reason.

On the other hand, the decomposed gas contained in the mixed gas does not de-sorb. Furthermore, in the first embodiment, the adsorbent 2*a* of the chemisorption type in the filter 2 catches the decomposed gas with certainty. Therefore, the decomposed gas is mixed neither into the gas separation equipment 5 nor the gas liquefaction system 6.

Therefore, the performance degradation related to chemical factors and physical factors does not occur. Thus, the lifetime of the equipment can be prolonged. Moreover, though a very small quantity of $SF_6$ gas remains in the nitrogen gas separated with the gas separation equipment 5, the adsorbent 18 in the storage tank 8 for exhaust gas adsorbs only $SF_6$ gas. The same effects can be obtained using a column containing the absorbent 18 instead of the storage tank 8.

Figure 6:
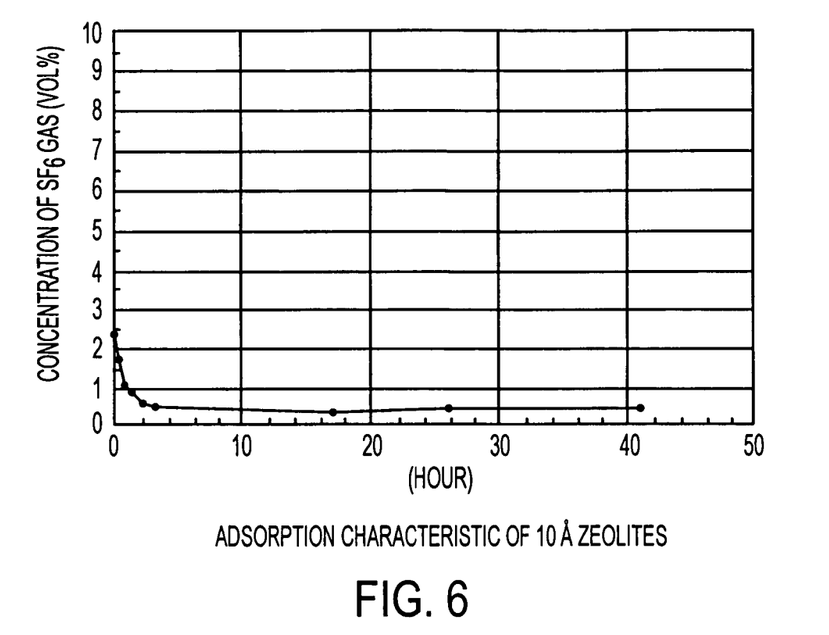
FIG. 6 is a graph showing the adsorption characteristics of a Zeolite.

FIG. 6 shows the change of $SF_6$ gas concentration of a mixed gas with 5% $SF_6$ gas at a pressure of 0.2 MPa when using an adsorbent comprising 10 Å Zeolites. FIG. 6 shows that the adsorbent also adsorbs a very small quantity of $SF_6$ gas with certainty. In addition, $SF_6$ gas adsorption with an adsorbent 18 having the 10 Å Zeolites become saturated. Therefore, after the predetermined quantity processing of $SF_6$ gas, while $SF_6$ gas is reclaimed under the reduced pressure, the adsorbent 18 needs to be restored into its initial condition.

In this case, the vacuum/compression pump 3 sends the mixed gas having nitrogen gas, which is the main ingredient, and $SF_6$ gas into the buffer tank 4, through the piping 13. Moreover, experiments show that the adsorption power of the adsorbent is in inverse proportion to temperature. That is, if temperature is lowered, $SF_6$ gas adsorbed to the Zeolites increases. On the one hand, $SF_6$ gas remaining in the gas phase decreases.

In other words, if the temperature is raised, the adsorption power will decline, and if the temperature is lowered, the adsorption power increases. That is, when the reproducing of the absorbent is required in a short time, it is better that the temperature is at 80–100 degrees C.

Since the separation reclaiming is carried out, almost all discharge to the atmosphere of $SF_6$ gas can be reduced to the appropriate discharge level. Thus, the discharge level shows outstanding environmental harmony.

Moreover, as shown in FIG. 6, according to the experiment, it is ascertained that $SF_6$ gas can be adsorbed by supplying discharge gas into an adsorbent vessel filled with an adsorbent 18 of 10 Å Zeolites. In this case, if the reduced pressure processing is carried out at a gas exit side, $SF_6$ gas will disperse to the adsorbent in a non-adsorbed portion. Therefore, it is better to perform the reduced pressure processing and to reproduce the adsorbent from the gas entrance side of the column (not shown) provided in the storage tank 8 for exhaust gas. Therefore, it is not necessity to supply a trap at the buffer tank 4. That is, the same effect as the mentioned effect can be attained by flowing the exhaust gas to the adsorbent vessel, filled with the adsorbent 18 having 10 Å Zeolites.

As mentioned above, in the first embodiment, the gas separation equipment 5 separates mixed gas into $SF_6$ gas and nitrogen gas. In this separation operation, preventing $SF_6$ gas mixing into nitrogen gas as much as possible is desirable. For this reason, when sending $SF_6$ gas reclaimed in the gas separation equipment 5 to the pump 3, $SF_6$ gas is also reclaimed by supplying the nitrogen gas together.

In this case, if the nitrogen gas is reclaimed continuously, $SF_6$ gas and the nitrogen gas continue to accumulate in the gas liquefaction system 6. In other words, although $SF_6$ gas is liquefied by the gas liquefaction system 6, the nitrogen gas continues to accumulate gradually in the gas state. Therefore, the pressure in the gas liquefaction system 6 may exceed the design pressure.

To prevent this problem, in the first embodiment, nitrogen gas can be returned to the buffer tank 4 from the gas liquefaction system 6 through the reflux-line 19. Thereby, an improvement in safety is obtained. Further, the reclaiming efficiency of $SF_6$ gas improves sharply by passing this gas again through the gas separation equipment 5 and the gas liquefaction system 6, even though $SF_6$ gas remains mixed in the nitrogen gas. Therefore, in the reclaiming $SF_6$ gas, the discharge of $SF_6$ gas to the atmosphere can be ignored.

In addition, the same effect as mentioned above can be achieved by keeping nitrogen gas in another container temporarily and returning it to the gas separation equipment 5, instead of returning the nitrogen gas through the reflux-line 19 automatically.

Figure 7:
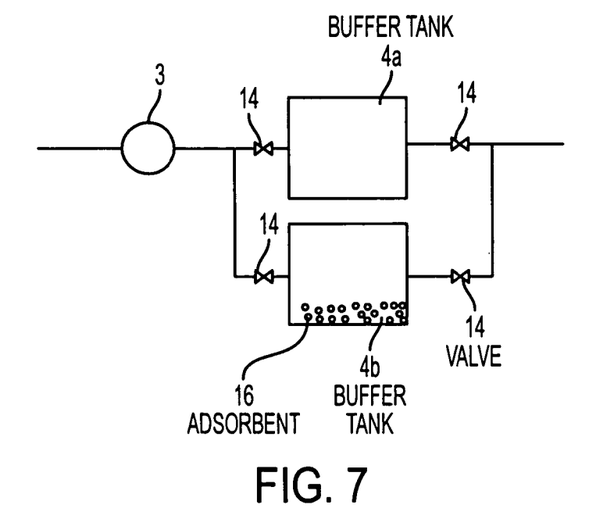
FIG. 7 is a diagram showing the gas reclaiming equipment according to a second embodiment of the present invention.
Figure 8:
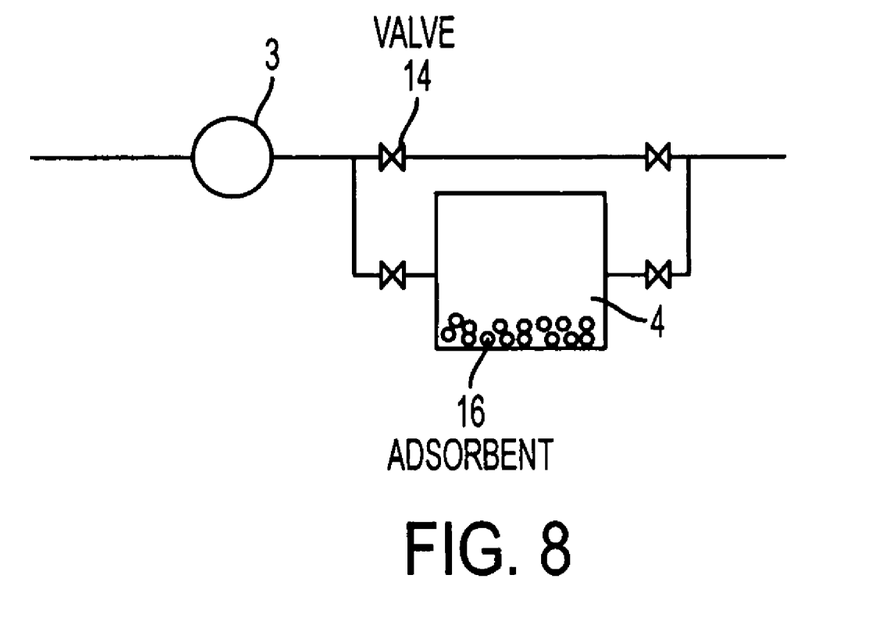
FIG. 8 is a diagram showing the gas reclaiming equipment according to another embodiment of the present invention.

A second embodiment is shown in FIG. 7 and FIG. 8. The second embodiment encloses an adsorbent 16 with 5 Å and 10 Å Zeolites in the buffer tank 4.

In FIG. 7, two buffer tanks 4*a* and 4*b* are provided. Furthermore, the adsorbent 16 is enclosed only within the buffer tank 4*b*. In this embodiment, the pressure of the mixed gas is reduced by controlling the valve 14, and mixed gas is reclaimed. The buffer tanks 4*a* and 4*b*, having the adsorbent 16, serve so that the mixed gas may be stored.

According to this embodiment, the adsorbent 16 enclosed in the buffer tank 4*b* can reliably catch the decomposed gas which passes through the filter 2. Furthermore, the decomposed gas does not mix in the gas separation equipment 5 or the gas liquefaction system 6. Therefore, it is possible to prevent the chemical degradation and physical degradation and to prolong the lifetime of the equipment.

Only when the mixed gas is reclaimed under the reduced pressure, can the mixed gas be stored in the buffer tanks 4*a* and 4*b*. Further, the mixed gas can only be passed under a designated pressurization state through the buffer tanks 4*a* and 4*b* to an atmospheric pressure.

Therefore, at the beginning of the reclaiming work, with the high gas pressure of the gas-insulated equipment 1, the mixed gas can be reclaimed quickly, and shortening of reclaiming work hours can be attained. Moreover, since an adsorbent 16 with 5 Å and 10 Å Zeolites is used, the quantity of the adsorption of $SF_6$ gas can be suppressed. Furthermore, it is possible to adsorb a molecule larger than 5 Å quickly from the decomposed gas.

In addition, it is good not to perform the reduced pressure processing in the buffer tanks 4*a* and 4*b*, but to perform an operation-stop in the state where a pressure has slightly been applied. That is, it can prevent the decomposed gas from de-sorbing from the adsorbent by applying a pressure within about 0.1–0.2 Mpa, for a while. Furthermore, a film for the gas separation equipment, as another embodiment, can be used. That is, the thing adapting the difference of the dissolution to a molecular size, a film material for example, can be considered. A film material made from a macromolecule can be used as an example.

Figure 9:
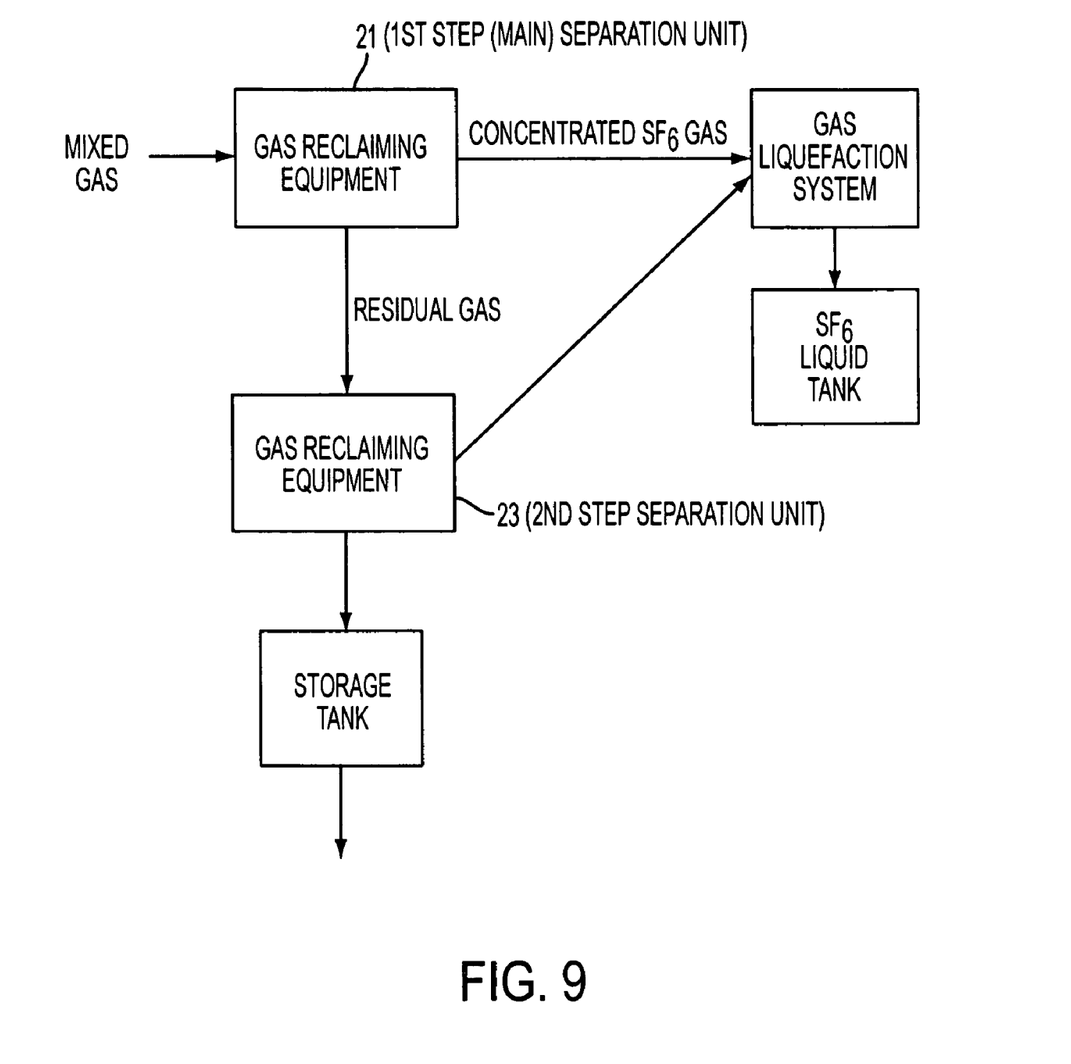
FIG. 9 is a diagram showing an embodiment of the invention with plural gas separation units.

Even, as a further embodiment, the gas reclaiming equipment can have plural gas separation units. This embodiment is illustrated in FIG. 9. For example, in the first place, the mixed gas is led to a 1st gas separation unit 21, and the 1st step gas separation unit 21 reclaims concentrated $SF_6$ gas. Then, gas discharged from the gas reclaiming equipment is led to a 2nd gas separation unit 23. The 2nd step of the gas separation unit 23 again concentrates $SF_6$ gas contained in a very small quantity.

According to this embodiment, $SF_6$ gas with high purity and the reduction of the liquefaction pressure of $SF_6$ gas can be attained by performing plural gas separation processes. Moreover, another embodiment relates to the gas insulated equipment side for making gas reclaiming easy. In this embodiment, an adsorbent with 5 Å and 10 Å Zeolites is enclosed as a decomposed gas removal material and a desiccant in the gas insulated equipment 1. As the object for the dryness in the gas insulated equipment 1, and the adsorbent for decomposed gas removal, the embodiment is characterized by enclosing an adsorbent mixture with 5 Å and 10 Å Zeolites.

As for the ratio of the adsorbent with 5 Å and 10 Å Zeolites, it is desirable that the former becomes more than 80 wt % and the latter becomes less than 20 wt %.

The quantity of $SO_2F_2$ generated is small compared with $SOF_2$ generated, and it is known that it is ordinarily 1/10 or less. In this embodiment, the adsorbent has two types, approximately 5 Å size and 10 Å size of pores in the gas-insulated equipment 1, according to the above-mentioned ratio.

The quantity of $SF_6$ gas adsorption in the gas insulated equipment 1 can be minimized, while maintaining the adsorption performance of the decomposed gas. That is, $SF_6$ gas does not escape from the gas-insulated equipment 1 for a long period of time, when reduced pressure reclaiming is performed. Consequently, reclaiming working hours can be shortened and reclaiming efficiency improved.

According to the present invention, the reclaiming performance of $SF_6$ gas can be improved by setting the reflux-line and returning the gas in the gas phase in the gas liquefaction system to the mixed gas introduction section. Moreover, according to the present invention, $SF_6$ gas and other insulated gases are efficiently separable with a unique adsorption action of the adsorbent.

Shortening of reclaiming working hours can be attained by this separation, raising $SF_6$ gas concentration and raising the reclaiming efficiency under reduced pressure. Furthermore, according to the present invention, longevity of the life of the equipment can be enabled by removing decomposed gas discharged from the gas insulated equipment. Furthermore, the optimization of the combination and ratio in the adsorbent in the gas insulated equipment can be attained, and outstanding reclaiming efficiency can be demonstrated.

Japanese priority Application No. PH 11-282045, filed on Oct. 1, 1999, including the specification, drawings, claims and abstract, is hereby incorporated by reference.

What is claimed is:

1. A gas reclaiming equipment for reclaiming $SF_6$ gas, comprising:
    a first filter for removing a decomposed gas and a foreign particulate substance from a mixed gas containing $SF_6$ gas which is sent from a gas insulated equipment;
    a gas separation equipment configured to separate said $SF_6$ gas from said mixed gas to obtain a $SF_6$ concentrated mixed gas;
    a gas liquefaction system for reclaiming said $SF_6$ concentrated mixed gas, wherein said gas liquefaction system liquefies said $SF_6$ gas of said $SF_6$ concentrated mixed gas by pressurizing said $SF_6$ concentrated mixed gas, wherein said gas separation equipment is provided between said gas insulated equipment and said gas liquefaction system;
    a pump for sending said $SF_6$ concentrated mixed gas from said gas insulated equipment to said gas liquefaction system;
    a first storage tank for accumulating an $SF_6$ liquid obtained by said gas liquefaction system; and
    a second storage tank storing a specified gas separated by said gas separation equipment, said second storage tank including an adsorbent to adsorb said $SF_6$ gas.

2. The gas reclaiming equipment according to claim 1, wherein said filter has an adsorbent of a chemisorption type which absorbs said decomposed gas.

3. A gas processing system, comprising:
    the gas reclaiming equipment according to claim 1; and
    a gas insulated equipment providing the mixed gas to the gas reclaiming equipment, wherein said gas insulated equipment has an adsorbent having Zeolites with approximately 5 Å pore size and 10 Å pore size, and having a ratio of said Zeolites wherein the 5 Å pore size is more than 80 wt % and said Zeolites with 10 Å pore size is less than 20 wt %.

4. The gas reclaiming equipment of claim 1, further comprising:
    a buffer tank for storing said mixed gas, said buffer tank provided between said gas insulated equipment and said gas separation equipment.

5. The gas reclaiming equipment according to claim 4, wherein said buffer tank has an adsorbent comprising Zeolites with 5 Å pore size and 10 Å pore size.

6. The gas reclaiming equipment according to claim 4, wherein said buffer tank stores said mixed gas when said mixed gas is reclaimed under reduced pressure.

7. The gas reclaiming equipment according to claim 4, wherein said gas separation equipment includes pressure swing adsorption including an adsorbent with selective adsorption.

8. The gas reclaiming equipment according to claim 4, wherein said gas separation equipment has a second filter with a permeable membrane.

9. The gas reclaiming equipment according to claim 4, wherein said gas separation equipment has plural separating units to separate said $SF_6$ gas from said mixed gas.

10. The gas reclaiming equipment according to claim 4, wherein said filter has an adsorbent to adsorb said decomposed gas.

11. The gas reclaiming equipment according to claim 4, wherein said gas separation equipment includes an adsorbent having Zeolites with approximately 5 Å pore size and 10 Å pore size, and wherein a ratio of said Zeolites with 5 Å pore size is more than 80 wt % and said Zeolites with 10 Å pore size is less than 20 wt %.

12. A method of reclaiming insulating gas from a mixed gas of a gas insulated equipment comprising:
    flowing the mixed gas though a filter to remove decomposed gas and foreign particulate substances;
    separating said insulating gas from said mixed gas in a gas separating unit to obtain concentrated insulating mixed gas and sending said concentrated insulating mixed gas to a gas liquefaction system;

pressurizing the concentrated insulating mixed gas to produce a liquid;

accumulating the liquid in a first storage tank;

storing a specified gas separated in said separating step in a second storage tank, said second storage tank including an adsorbent to adsorb $SF_6$ gas; and returning gas in the gas phase from the gas liquefaction system to an upstream side of the gas liquefaction system.

13. The method of claim 12, further comprising chemisorbing decomposed gas in said filter.

14. The method of claim 12, wherein said gas separation unit includes an adsorbent having Zeolites with approximately 5 Å pore size and 10 Å pore size, and wherein a ratio of said Zeolites with 5 Å size is more than 80 wt % and said Zeolites with 10 Å pore size is less than 20 wt %.

15. A method of reclaiming insulating gas from a mixed gas of a gas insulated equipment comprising:

flowing the mixed gas though a filter to remove decomposed gas and foreign particulate substances;

flowing said mixed gas through a gas separating unit to obtain concentrated insulating mixed gas and a specified gas and sending said concentrated insulating mixed gas to a gas liquefaction system;

pressurizing an $SF_6$ gas of the concentrated insulating mixed gas; and storing said specified gas in a storage tank wherein said storage tank includes an adsorbent to adsorb decomposed gas.

16. A method of reclaiming insulating gas from a mixed gas of a gas insulated equipment comprising:

flowing the mixed gas though a filter to remove decomposed gas and foreign particulate substances;

flowing said mixed gas through a gas separating unit to obtain concentrated insulating mixed gas and a specified gas and sending said concentrated insulating mixed gas to a gas liquefaction system;

pressurizing an $SF_6$ gas of the concentrated insulating mixed gas; and storing said specified gas in a storage tank, wherein said storage tank includes an adsorbent to adsorb $SF_6$ gas.

17. The method of claim 12, further comprising flowing the mixed gas through a buffer tank.

18. The method of claim 17, wherein said buffer tank includes an adsorbent having Zeolites with approximately 5 Å pore size and 10 Å pore size, and wherein a ratio of said Zeolites with 5 Å pore size is more than 80 wt % and said Zeolites with 10 Å pore size is less than 20 wt %.

19. The gas reclaiming equipment according to claim 1, further comprising a line for returning a specified gas in the gas phase in said gas liquefaction system to an upstream side of said gas liquefaction system.

20. The gas reclaiming equipment according to claim 4, further comprising a line for returning a specified gas in the gas phase in said gas liquefaction system to an upstream side of said gas liquefaction system.

21. The gas reclaiming equipment according to claim 4, wherein said gas separation equipment includes an adsorbent having Zeolites with approximately 5 Å pore size.

22. A gas reclaiming equipment, for reclaiming $SF_6$ gas, comprising:

a first filter for removing a decomposed gas and a foreign particulate substance from a mixed gas containing $SF_6$ gas which is sent from a gas insulated equipment;

a gas separation equipment that is configured to separate said $SF_6$ gas from said mixed gas to obtain a $SF_6$ concentrated mixed gas;

a gas liquefaction system for reclaiming said $SF_6$ concentrated mixed gas, wherein said gas liquefaction system liquefies said $SF_6$ gas of said $SF_6$ concentrated mixed gas by pressurizing said $SF_6$ concentrated mixed gas, wherein said gas separation equipment is provided between said gas insulated equipment and said gas liquefaction system;

a pump for sending said $SF_6$ concentrated mixed gas from said gas insulated equipment to said gas liquefaction system; and a storage tank for accumulating an $SF_6$ liquid obtained by said gas liquefaction system, wherein said gas separation equipment includes an adsorbent having Zeolites with approximately 5 Å pore size and 10 Å pore size, and wherein a ratio of said Zeolites with 5 Å pore size is more than 80 wt % and said Zeolites with 10 Å pore size is less than 20 wt %.

23. The gas reclaiming equipment according to claim 1, wherein said second storage tank has a cylindrical shape.

* * * * *